US010803109B2

(12) United States Patent
Cao et al.

(10) Patent No.: US 10,803,109 B2
(45) Date of Patent: Oct. 13, 2020

(54) METHOD AND DEVICE FOR READING AND WRITING VIDEO DATA IN NAS DEVICE

(71) Applicant: Hangzhou Hikvision Digital Technology Co., Ltd., Hangzhou, Zhejiang (CN)

(72) Inventors: Li Cao, Zhejiang (CN); Weichun Wang, Zhejiang (CN)

(73) Assignee: Hangzhou Hikvision Digital Technology Co., Ltd., Hangzhou, Zhejiang (CN)

( * ) Notice: Subject to any disclaimer, the term of this patent is extended or adjusted under 35 U.S.C. 154(b) by 198 days.

(21) Appl. No.: 15/769,324

(22) PCT Filed: Aug. 10, 2016

(86) PCT No.: PCT/CN2016/094403
§ 371 (c)(1),
(2) Date: Apr. 18, 2018

(87) PCT Pub. No.: WO2017/067297
PCT Pub. Date: Apr. 27, 2017

(65) Prior Publication Data
US 2018/0307684 A1 Oct. 25, 2018

(30) Foreign Application Priority Data

Oct. 21, 2015 (CN) .......................... 2015 1 0688290

(51) Int. Cl.
G06F 16/41 (2019.01)
G06F 16/44 (2019.01)
(Continued)

(52) U.S. Cl.
CPC .............. *G06F 16/41* (2019.01); *G06F 3/061* (2013.01); *G06F 3/067* (2013.01); *G06F 3/0661* (2013.01);
(Continued)

(58) Field of Classification Search
CPC ...................................................... G06F 16/41
(Continued)

(56) References Cited

U.S. PATENT DOCUMENTS 7,437,530 B1  10/2008  Rajan
7,584,279 B1   9/2009  Chapman
(Continued)

FOREIGN PATENT DOCUMENTS

CN      101090480 A    12/2007
CN      101673288 A     3/2010
(Continued)

Primary Examiner — Syling Yen
(74) Attorney, Agent, or Firm — Bret E. Field; Bozicevic, Field & Francis LLP

(57) ABSTRACT

Embodiments of the present application provide a method for reading and writing video data in a NAS device. The NAS device is mounted to a block interface of a storage server and includes a plurality of data files, and the correspondence between disk block numbers of block devices and filenames of the data files in the NAS device is stored in the index server. In the present application, a reading or writing request sent by the client device is received, a filename of a data file which data is to be read from or written into is located, and then a reading or writing operation is performed in the data file corresponding to the determined filename in the NAS device. In the present application, a reading or writing operation on a block device is transformed into a reading or writing operation on a data file in a NAS device so that a video cloud storage system can support the NAS device.

14 Claims, 7 Drawing Sheets

(51) Int. Cl.
*G06F 16/182* (2019.01)
*G06F 3/06* (2006.01)
*H04L 29/08* (2006.01)

(52) U.S. Cl.
CPC ........ *G06F 16/183* (2019.01); *G06F 16/1824* (2019.01); *G06F 16/44* (2019.01); *H04L 67/1097* (2013.01)

(58) Field of Classification Search
USPC .................................................. 707/823
See application file for complete search history.

(56) References Cited

U.S. PATENT DOCUMENTS

| | | | |
|---|---|---|---|
| 8,650,359 B2 | 2/2014 | Vaghani et al. | |
| 10,289,496 B1* | 5/2019 | Chopra | G06F 11/1464 |
| 2008/0184001 A1 | 7/2008 | Stager | |
| 2011/0113428 A1 | 5/2011 | Nelson et al. | |
| 2013/0054889 A1* | 2/2013 | Vaghani | G06F 3/0604 |
| | | | 711/114 |
| 2017/0091045 A1* | 3/2017 | Bangalore | G06F 16/178 |

FOREIGN PATENT DOCUMENTS

| | | |
|---|---|---|
| CN | 102088491 A | 6/2011 |
| CN | 103294407 A | 9/2013 |
| CN | 103593147 A | 2/2014 |
| CN | 103856503 A | 6/2014 |
| CN | 104050248 A | 9/2014 |
| CN | 104539746 A | 4/2015 |

\* cited by examiner

METHOD AND DEVICE FOR READING AND WRITING VIDEO DATA IN NAS DEVICE

The present application claims the priority to a Chinese patent application No. 201510688290.8, filed with the State Intellectual Property Office of People's Republic of China on Oct. 21, 2015 and entitled "METHOD AND DEVICE FOR READING AND WRITING VIDEO DATA IN NAS DEVICE", which is incorporated herein by reference in its entirety.

TECHNICAL FIELD

The present application relates to the technical field of cloud storage for video, in particular to a method and device for reading and writing video data in a NAS device.

BACKGROUND

With the development of science and technology, cloud storage technology has come into wide use.

Existing cloud storage systems do not support NAS (Network Attached Storage) devices because videos, unlike text files, cannot be stored in NAS devices in the format of files due to the large amount of data thereof. A video may have to be divided into several parts, each of which is to be stored into a block device. Although the storage of video may be achieved with such block devices, NAS devices are more and more widely used due to the low cost and high storage efficiency thereof.

Therefore, how to make a storage system for video to support NAS devices is an urgent technical problem to be solved.

SUMMARY

An object of embodiments of the present application is to provide a method and device for reading and writing video data in a NAS device so that a video cloud storage system can support the NAS device.

To achieve the above object, an embodiment of the present application provides a method for reading video data in a Network Attached Storage (NAS) device, which is applied to a storage server of a video cloud storage system, wherein the video cloud storage system includes the storage server, an index server, and a NAS device mounted to a block interface of the storage server; the storage server is connected to the index server, the NAS device, and a client device respectively; the NAS device includes a plurality of data files; and the correspondence between disk block numbers of block devices and filenames of the data files in the NAS device is stored in the index server, and wherein the method includes:

receiving a reading request sent by the client device, wherein the reading request carries a disk block number of a block device to be read from;

sending a NAS device filename acquisition request to the index server, wherein the acquisition request carries the disk block number;

receiving a filename of a data file in the NAS device which is fed back by the index server based on the correspondence; and returning video data in the data file having the received filename in the NAS device to the client device according to the reading request.

Optionally, the NAS device includes a plurality of NAS device storage directories, each of which includes a plurality of data files;

after receiving a filename of a data file in the NAS device which is fed back by the index server based on the correspondence and before returning video data in the data file having the received filename in the NAS device to the client device according to the reading request, the method includes:

determining a NAS device storage directory in which the data file corresponding to the received filename is located according to a division mode of data files in the NAS device storage directories; and returning video data in the data file having the received filename in the NAS device to the client device according to the reading request includes:

returning video data in the data file having the received filename in the determined storage directory in the NAS device to the client device, according to the reading request.

Optionally, each data file in the NAS device occupies a storage space with a same data volume, the correspondence is a one-to-one correspondence, and a filename and a disk block number having the one-to-one correspondence are represented by a same Arabic numeral; and determining a NAS device storage directory in which the data file corresponding to the received filename is located according to a division mode of data files in the NAS device storage directories includes:

obtaining the maximum number of data files in each storage directory, wherein the maximum number of data files in each storage directory is the same;

dividing the received filename of the data file in the NAS device by the maximum number to obtain a remainder; and determining whether the remainder is 0; if so, dividing the received filename of the data file in the NAS device by the maximum number to obtain a quotient, and determining, according to the quotient, the NAS device storage directory in which the data file corresponding to the received filename of the data file in the NAS device is located; if not, dividing the received filename of the data file in the NAS device by the maximum number to obtain a quotient, adding the quotient and 1 to obtain an addition result, and determining, according to the addition result, the NAS device storage directory in which the data file corresponding to the received filename of the data file in the NAS device is located.

Optionally, the NAS device storage directory further stores a control file in which metadata information is stored; and returning video data in the data file having the received filename in the determined storage directory in the NAS device to the client device, according to the reading request includes:

returning the video data in the data file having the received filename in the determined storage directory in the NAS device to the client device by using the metadata information in the control file, according to the reading request.

An embodiment of the present application provides a method for writing video data into a NAS device, which is applied to a storage server in a video cloud storage system, wherein the video cloud storage system includes the storage server, an index server, and a NAS device mounted to a block interface of the storage server; the storage server is connected to the index server, the NAS device, and a client device respectively; the NAS device includes a plurality of data files; and the correspondence between disk block numbers of block devices and filenames of the data files in the NAS device is stored in the index server, and wherein the method includes:

receiving a writing request for writing video data into a block device, which is sent by the client device;

allocating a disk block number of a block device to video data to be written according to the writing request;

returning the allocated disk block number of the block device to the client device;

receiving the video data and the disk block number of the block device into which the video data is to be written, which are sent by the client device;

sending a NAS device filename acquisition request to the index server, wherein the acquisition request carries the disk block number;

receiving a filename of a data file in the NAS device which is fed back by the index server based on the correspondence; and writing the received video data into the data file corresponding to the received filename in the NAS device.

Optionally, the NAS device includes a plurality of NAS device storage directories, each of which includes a plurality of data files;

after receiving a filename of a data file in the NAS device which is fed back by the index server based on the correspondence and before writing the received video data into the data file corresponding to the received filename in the NAS device, the method further includes:

determining a NAS device storage directory in which the data file corresponding to the received filename is located according to a division mode of data files in the NAS device storage directories; and writing the received video data into the data file corresponding to the received filename in the NAS device includes:

writing the received video data into the data file corresponding to the received filename in the determined NAS device storage directory in the NAS device.

Optionally, each data file in the NAS device occupies a storage space with a same data volume, the correspondence is a one-to-one correspondence, and a filename and a disk block number having the one-to-one correspondence are represented by a same Arabic numeral; and determining a NAS device storage directory in which the data file corresponding to the received filename is located according to a division mode of data files in NAS device storage directories includes:

obtaining the maximum number of data files in each storage directory, wherein the maximum number of data files in each storage directory is the same;

dividing the received filename of the data file in the NAS device by the maximum number to obtain a remainder; and determining whether the remainder is 0; if so, dividing the received filename of the data file in the NAS device by the maximum number to obtain a quotient, and determining, according to the quotient, the NAS device storage directory in which the data file corresponding to the received filename of the data file in the NAS device is located; if not, dividing the received filename of the data file in the NAS device by the maximum number to obtain a quotient, adding the quotient and 1 to obtain an addition result, and determining, according to the addition result, the NAS device storage directory in which the data file corresponding to the received filename of the data file in the NAS device is located.

Optionally, the NAS device storage directory further stores a control file in which metadata information is stored, and writing the received video data into the data file corresponding to the received filename includes:

writing the received video data into the data file corresponding to the received filename in the determined storage directory, according to the metadata information in the control file.

An embodiment of the present application provides a reading device for reading video data in a Network Attached Storage (NAS) device, which is applied to a storage server of a video cloud storage system, wherein the video cloud storage system includes the storage server, an index server, and a NAS device mounted to a block interface of the storage server; the storage server is connected to the index server, the NAS device, and a client device respectively; the NAS device includes a plurality of data files; and the correspondence between disk block numbers of block devices and filenames of the data files in the NAS device is stored in the index server, and wherein the reading device includes:

a reading request receiving unit configured to receive a reading request sent by the client device, wherein the reading request carries a disk block number of a block device to be read from;

a filename request sending unit configured to send a NAS device filename acquisition request to the index server, wherein the acquisition request carries the disk block number;

a filename receiving unit configured to receive a filename of a data file in the NAS device which is fed back by the index server based on the correspondence; and a data sending unit configured to return video data in the data file having the received filename in the NAS device to the client device, according to the reading request.

Optionally, the NAS device includes a plurality of NAS device storage directories, each of which includes a plurality of data files;

the reading device further includes: a first directory determining unit configured to determine a NAS device storage directory in which the data file corresponding to the received filename is located according to a division mode of data files in the NAS device storage directories, after the filename receiving unit receives the filename of the data file in the NAS device which is fed back by the index server based on the correspondence and before the data sending unit returns video data in the data file having the received filename in the NAS device to the client device according to the reading request; and the data sending unit is configured to return video data in the data file having the received filename in the determined storage directory in the NAS device to the client device, according to the reading request.

Optionally, each data file in the NAS device occupies a storage space with a same data volume, the correspondence is a one-to-one correspondence, and a filename and a disk block number having the one-to-one correspondence are represented by a same Arabic numeral; and the first directory determining unit includes:

a number obtaining subunit configured to obtain the maximum number of data files in each storage directory, wherein the maximum number of data files in each storage directory is the same;

a remainder obtaining subunit configured to divide the received filename of the data file in the NAS device by the maximum number to obtain a remainder; and a quotient obtaining subunit configured to determine whether the remainder is 0; if so, divide the received filename of the data file in the NAS device by the maximum number to obtain a quotient, and determine, according to the quotient, the NAS device storage directory in which the data file corresponding to the received filename of the data file in the NAS device is located; if not, divide the received filename of the data file in the NAS device by the maximum number to obtain a quotient, add the quotient and 1 to obtain an addition result, and determine, according to the addition result, the NAS device storage directory in which the data file corresponding to the received filename of the data file in the NAS device is located.

Optionally, the NAS device storage directory further stores a control file in which metadata information is stored; and the data sending unit is configured to return video data in the data file having the received filename in the determined storage directory in the NAS device to the client device by using the metadata information in the control file, according to the reading request.

An embodiment of the present application provides a writing device for writing video data into a NAS device, which is applied to a storage server in a video cloud storage system, wherein the video cloud storage system includes the storage server, an index server, and a NAS device mounted to a block interface of the storage server; the storage server is connected to the index server, the NAS device, and a client device respectively; the NAS device includes a plurality of data files; and the correspondence between disk block numbers of block devices and filenames of the data files in the NAS device is stored in the index server, and wherein the writing device includes:

a writing request receiving unit configured to receive a writing request for writing video data into a block device, which is sent by the client device;

a block number allocating unit configured to allocate a disk block number of a block device to video data to be written according to the writing request;

a block number returning unit configured to return the allocated disk block number of the block device to the client device;

a data receiving unit configured to receive the video data and the disk block number of the block device into which the video data is to be written, which are sent by the client device;

a filename request sending unit configured to send a NAS device filename acquisition request to the index server, wherein the acquisition request carries the disk block number;

a filename receiving unit configured to receive a filename of a data file in the NAS device which is fed back by the index server based on the correspondence; and a data writing unit configured to write the received video data into the data file corresponding to the received filename in the NAS device.

Optionally, the NAS device includes a plurality of NAS device storage directories, each of which includes a plurality of data files; the writing device further includes a second directory determining unit configured to determine a NAS device storage directory in which the data file corresponding to the received filename is located according to a division mode of data files in the NAS device storage directories, after the filename receiving unit receives the filename of the data file in the NAS device which is fed back by the index server based on the correspondence and before the data writing unit writes the received video data into the data file corresponding to the received filename in the NAS device; and the data writing unit is configured to write the received video data into the data file corresponding to the received filename in the determined NAS device storage directory in the NAS device.

Optionally, each data file in the NAS device occupies a storage space with a same data volume, the correspondence is a one-to-one correspondence, and a filename and a disk block number having the one-to-one correspondence are represented by a same Arabic numeral;

the second directory determining unit includes:

a number obtaining subunit configured to obtain the maximum number of data files in each storage directory, wherein the maximum number of data files in each storage directory is the same;

a remainder obtaining subunit configured to divide the received filename of the data file in the NAS device by the maximum number to obtain a remainder;

a quotient obtaining subunit configured to determine whether the remainder is 0; if so, divide the received filename of the data file in the NAS device by the maximum number to obtain a quotient, and determine, according to the quotient, the NAS device storage directory in which the data file corresponding to the received filename of the data file in the NAS device is located; if not, divide the received filename of the data file in the NAS device by the maximum number to obtain a quotient, add the quotient and 1 to obtain an addition result, and determine, according to the addition result, the NAS device storage directory in which the data file corresponding to the received filename of the data file in the NAS device is located.

Optionally, the NAS device storage directory further stores a control file in which metadata information is stored; and the data writing unit is configured to write the received video data into the data file corresponding to the received filename in the determined storage directory, according to the metadata information in the control file.

An embodiment of the present application provides a storage server, including: a housing, a processor, a memory, a circuit board, and a power supply circuit, wherein the circuit board is disposed inside a space enclosed by the housing, the processor and the memory are disposed on the circuit board, the power supply circuit is configured to supply power to various circuits or devices in the storage server, the memory is configured to store an executable code, and the processor is configured to execute a program corresponding to the executable code by reading the executable code stored in the memory, so as to perform the method for reading video data in a NAS device, or the method for writing video data into a NAS device.

An embodiment of the present application provides an executable code configured to perform the method for reading video data in a NAS device or the method for writing video data into a NAS device when being executed.

An embodiment of the present application provides a storage medium configured to store an executable code, wherein the executable code is configured to perform the method for reading video data in a NAS device or the method for writing video data into a NAS device.

In a method and device for reading and writing video data in a NAS device provided in embodiments of the present application, the NAS device is mounted to a block interface of the storage server and includes a plurality of data files, and the correspondence between disk block numbers of block devices and filenames of the data files in the NAS device is stored in the index server. Furthermore, in the present application, a reading or writing request sent by the client device is received, a filename of a data file which the data is to be read from or written into is determined, and then a reading or writing operation is performed in the data file corresponding to the determined filename in the NAS device. In the present application, a reading or writing operation on a block device is transformed into a reading or writing operation on a data file in a NAS device so that a video cloud storage system can support the NAS device. Of course, all the advantages above do not have to be achieved in any product or method of the present application.

BRIEF DESCRIPTION OF THE DRAWINGS

In order to describe the technical solutions of embodiments of the present application or of the prior art more clearly, a brief introduction of the drawings required in the description of the embodiments and of the prior art will be given. Obviously, the drawings described below are just for some embodiments of the present application and other drawings may be obtained by those of ordinary skills in the art based on these drawings without any creative effort.

DETAILED DESCRIPTION

A clear and thorough description of the technical solution in embodiments of the present application is given below with reference to the drawings in the embodiments of the present application. Obviously, the described embodiments are merely a part rather than all of the embodiments of the present application. Based on the embodiments of the present application, all other embodiments obtained by those of ordinary skills in the art without any creative efforts are within the protection scope of this application.

Figure 1:
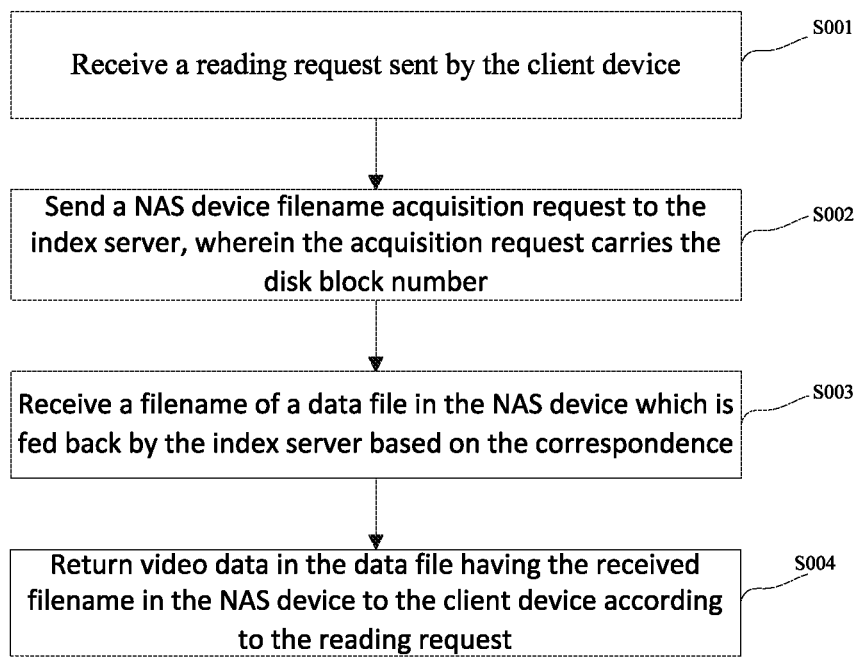
FIG. 1 is a flow chart of a method for reading video data in a NAS device according to an embodiment of the present application.
Figure 2:
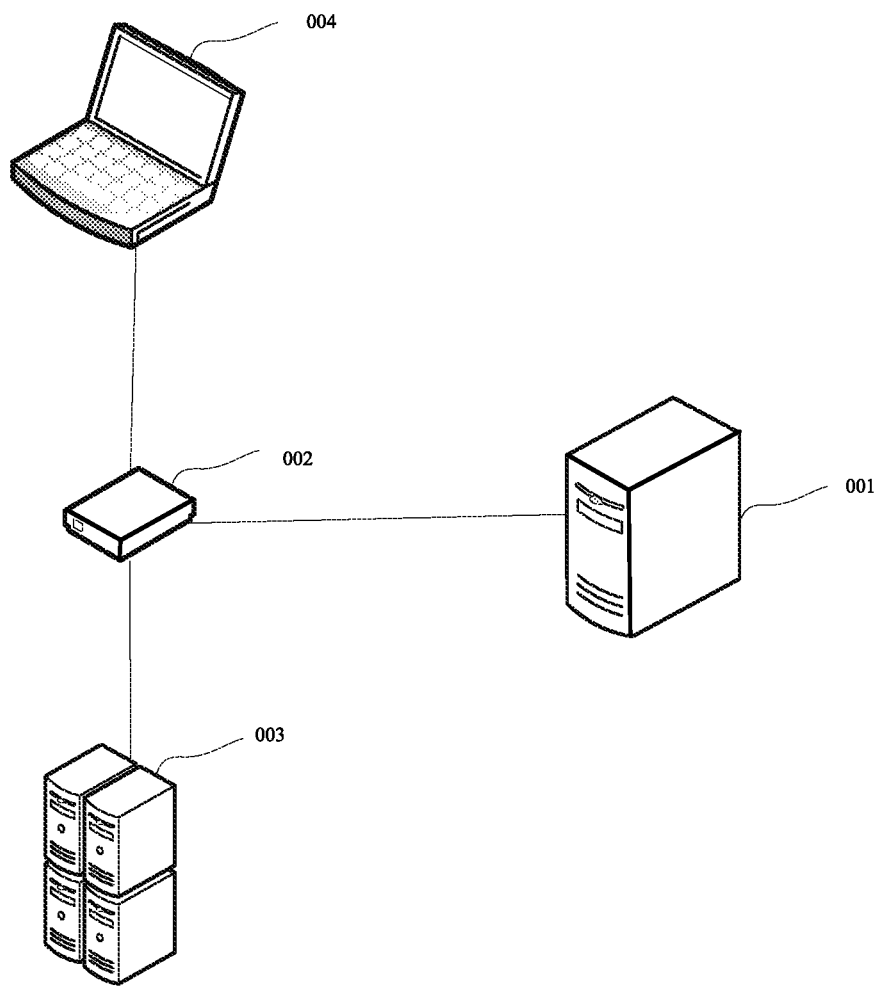
FIG. 2 is a structural schematic diagram of a video cloud storage system according to an embodiment of the present application.

As shown in FIG. 1, a method for reading video data in a NAS device is provided in an embodiment of the present application, which is applied to a storage server in a video cloud storage system. As shown in FIG. 2, the video cloud storage system includes an index server 001, a storage server 002 and a Network Attached Storage (NAS) device 003. The NAS device 003 is mounted to a block interface of the storage server 002, and the storage server 002 is connected to the index server 001, the NAS device 003, and a client device 004 respectively. The NAS device 003 includes a plurality of data files. The correspondence between disk block numbers of block devices and filenames of the data files in the NAS device 003 is stored in the index server 001. The method may include:

S001. Receive a reading request sent by the client device 004, wherein the reading request carries a disk block number of a block device to be read from.

S002. Send a NAS device filename acquisition request to the index server 001, wherein the acquisition request carries the disk block number.

S003. Receive a filename of a data file in the NAS device 003 which is fed back by the index server 001 based on the correspondence.

S004. Return video data in the data file having the received filename in the NAS device 003 to the client device 004, according to the reading request.

The NAS device 003 (also referred to as "network memory") is a dedicated data storage device, data-centric and totally separated from a server. Data is centrally managed on the NAS device 003, and as a result, release of bandwidth, improvement in performance, reduction in total cost of ownership, and protection for investment can be achieved.

In other embodiments of the present application, the NAS device 003 can be mounted to the block interface of the storage server 002 by establishing a communication path between the block interface of the storage server 002 and the NAS device 003.

In other embodiments of the present application, a minimum available mounting directory may be first calculated in the storage server 002. The calculation method may include: checking whether the mounting directory /mnt/nas_0001 exists, and if the mounting directory /mnt/nas_0001 exists, checking whether the mounting directory /mnt/nas_0002 exists, and if the mounting directory /mnt/nas_0002 exists, checking whether the mounting directory /mnt/nas_0003 exists, and so forth. If the calculated minimum available mounting directory is /mnt/nas_0005, it will be set as the mounting directory of the NAS device 003. A Linux system command 'mount' may then be executed to mount the NAS device 003 to the block interface of the storage server 002.

Any number of NAS devices 003 can be mounted to the block interface of the storage server 002.

Figure 3:
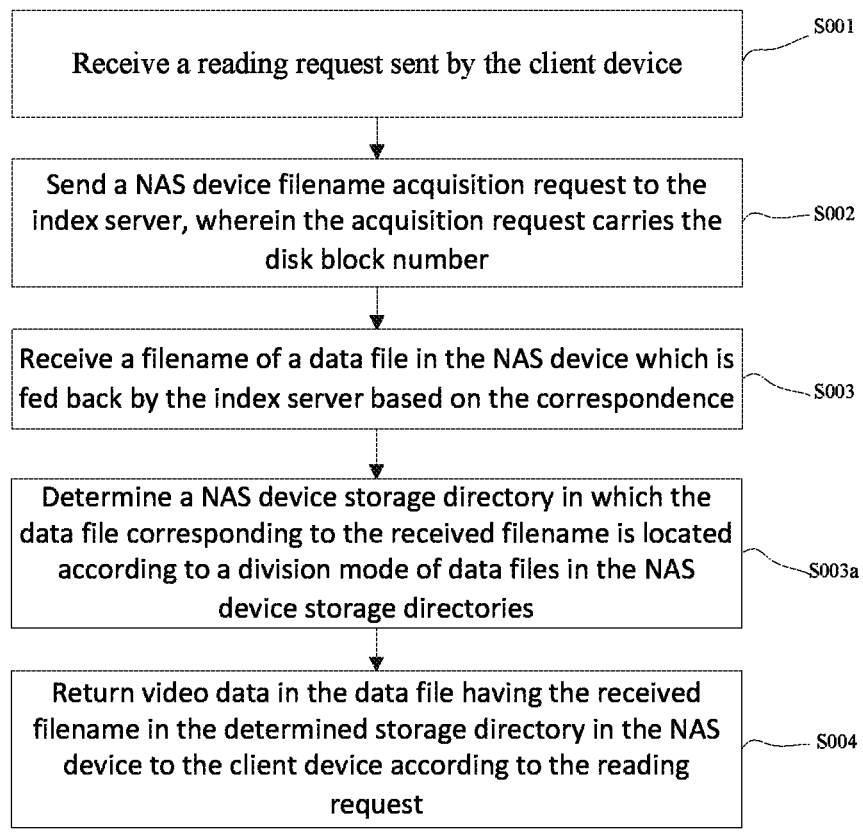
FIG. 3 is a flow chart of a method for reading video data in a NAS device according to another embodiment of the present application.

As shown in FIG. 3, in other embodiments of the present application, the NAS device 003 includes a plurality of NAS device storage directories, each of which includes a plurality of data files.

After Step 003 and before Step 004, the method as shown in FIG. 1 may further include:

S003a. Determine a NAS device storage directory in which the data file corresponding to the received filename is located according to a division mode of data files in the NAS device storage directories.

The step S004 may include: returning, according to the reading request, video data in the data file having the received filename in the determined storage directory in the NAS device 003 to the client device 004.

In other embodiments of the present application, data files in a storage directory may be divided in many ways, for example, according to a fixed size. For ease of management, an upper limit is set for the number of data files in each storage directory. Of course, the data files may also be divided in other ways, rather than according to a fixed size, and the present application is not limited in this regard.

Figure 4:
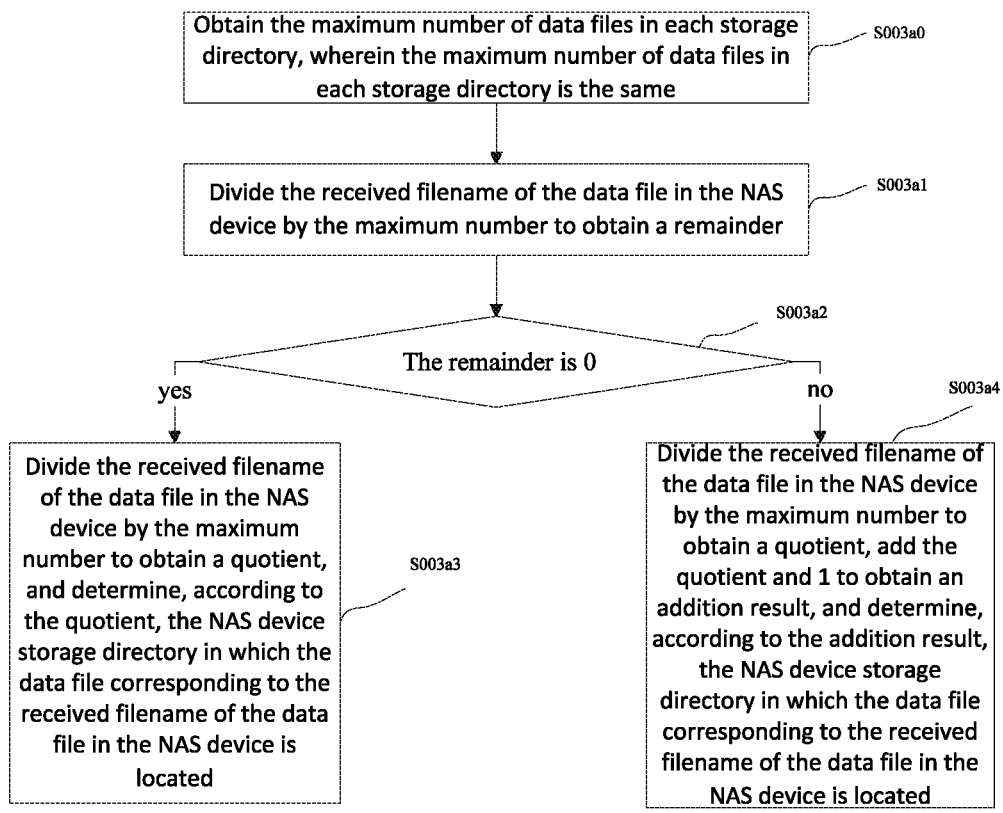
FIG. 4 is a flow chart of a method for reading video data in a NAS device according to another embodiment of the present application.

In addition, with respect to the method as shown in FIG. 3, in other embodiments of the present application, each data file in the NAS device 003 occupies a storage space with a same data volume, the correspondence is a one-to-one correspondence, and a filename and a disk block number having the one-to-one correspondence are represented by a same Arabic numeral. As shown in FIG. 4, the step S003a may include:

S003a0. Obtain the maximum number of data files in each storage directory, wherein the maximum number of data files in each storage directory is the same.

S003a1. Divide the received filename of the data file in the NAS device 003 by the maximum number to obtain a remainder.

S003a2. Determine whether the remainder is 0; if so, perform S003a3; if not, perform S003a4.

S003a3. Divide the received filename of the data file in the NAS device 003 by the maximum number to obtain a quotient, and determine, according to the quotient, the NAS device storage directory in which the data file corresponding to the received filename of the data file in the NAS device 003 is located.

S003a4. Divide the received filename of the data file in the NAS device 003 by the maximum number to obtain a quotient, add the quotient and 1 to obtain an addition result, and determine, according to the addition result, the NAS device storage directory in which the data file corresponding to the received filename of the data file in the NAS device 003 is located.

Examples are provided to illustrate the above.

Example 1

If the mounting directory is /mnt/nas_0005, the filename is 23, and the maximum number of data files in a storage directory is 1000, the storage directory will be 0000001. The file may be accessed through a path: /mnt/nas_0005/0000001/000023.

Example 2

If the mounting directory is /mnt/nas_0005, the filename is 1025, the maximum number of data files in a storage directory is 1024, the storage directory will be 0000002. The file may be accessed through a path: /mnt/nas_0005/0000002/001025.

Of course, in other embodiments of the present application, the step S003a may further include:

Step one. obtain the maximum number of data files in each storage directory, wherein the maximum number of data files in each storage directory is the same.

Step two. divide the received filename of the data file in the NAS device 003 by the maximum number to obtain a quotient, and add the quotient and 1 to obtain an addition result.

Step three. divide the received filename of the data file in the NAS device 003 by the maximum number to obtain a remainder.

Step four. determine whether the remainder is 0; if so, subtract 1 from the addition result in Step two, and determine, according to a subtraction result, the storage directory in which the data file corresponding to the received filename of the data file in the NAS device 003 is located; if not, determine, according to the addition result in Step two, the storage directory in which the data file corresponding to the received filename of the data file in the NAS device 003 is located.

Further, with respect to the embodiments as shown in FIG. 3 and FIG. 4, the storage directory further stores a control file in which metadata information is stored. Specifically, step S004 may include:

returning video data in the data file having the received filename in the determined storage directory in the NAS device 003 to the client device 004 by using the metadata information in the control file, according to the reading request.

The metadata information may include: the size of the control file, the size of the data file, the size of information region of the data file, and so on.

In other embodiments of the present application, the storage directory may store a main control file and a backup control file, which are the same as each other and back up each other to prevent damage or loss of one of them. In addition, the data file may further include three parts: a data region, a main information region and a backup information region, wherein the data region is configured to store video data of users, and the main information region and the backup information region have the same data, back up each other, and store index information of the data region.

The index information of the data region may record a time stamp of each I-frame in the data region, the offset of the I-frame in the data region, and the length of data of the I-frame in order to read data within a certain period.

In the method for reading video data in a NAS device provided in embodiments of the present application, the NAS device is mounted to a block interface of the storage server and includes a plurality of data files, and the correspondence between disk block numbers of block devices and filenames of the data files in the NAS device is stored in the index server. Furthermore, in the present application, a reading request sent by the client device is received, a filename of a data file in which the data to be read is located is determined, and then a reading operation is performed in the data file corresponding to the determined filename in the NAS device. In the present application, a reading operation on a block device is transformed into a reading operation on a data file in a NAS device so that a video cloud storage system can support the NAS device.

Corresponding to the above method embodiments, a reading device for reading video data in a NAS device is also provided in the embodiments of the present application.

Figure 5:
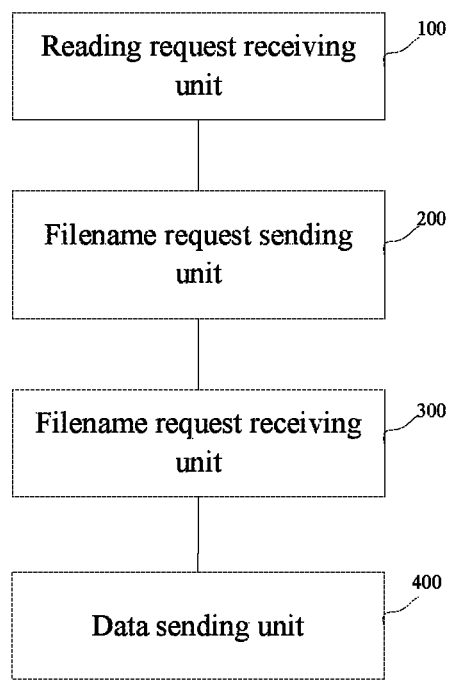
FIG. 5 is a structural schematic diagram of a reading device for reading video data in a NAS device according to an embodiment of the present application.

A reading device for reading video data in a NAS device provided in an embodiment of the present application is applied to a storage server in a video cloud storage system. As shown in FIG. 2, the video cloud storage system may include an index server 001, a storage server 002 and a Network Attached Storage (NAS) device 003. The NAS device 003 is mounted to a block interface of the storage server 002, and the storage server 002 is connected to the index server 001, the NAS device 003, and a client device 004 respectively. The NAS device 003 includes a plurality of data files. The correspondence between disk block numbers of block devices and filenames of the data files in the NAS device 003 is stored in the index server 001. As shown in FIG. 5, the device may include a reading request receiving unit 100, a filename request sending unit 200, a filename receiving unit 300, and a data sending unit 400.

The reading request receiving unit 100 is configured to receive a reading request sent by the client device 004, wherein the reading request carries a disk block number of a block device to be read from.

The filename request sending unit 200 is configured to send a NAS device filename acquisition request to the index server 001, wherein the acquisition request carries the disk block number.

The filename receiving unit 300 is configured to receive a filename of a data file in the NAS device 003 which is fed back by the index server 001 based on the correspondence.

The data sending unit 400 is configured to return video data in the data file having the received filename in the NAS device 003 to the client device 004 according to the reading request.

In other embodiments of the present application, the NAS device 003 includes a plurality of NAS device storage directories, each of which includes a plurality of data files. The reading device as shown in FIG. 5 may further include: a first directory determining unit configured to determine a NAS device storage directory in which the data file corresponding to the received filename is located according to a division mode of data files in the NAS device storage directories, after the filename receiving unit 300 receives the filename of the data file in the NAS device 003 which is fed back by the index server 001 based on the correspondence and before the data sending unit 400 returns video data in the data file having the received filename in the NAS device 003 to the client device 004 according to the reading request.

Specifically, the data sending unit 400 is configured to return video data in the data file having the received filename in the determined storage directory in the NAS device 003 to the client device 004, according to the reading request.

In other embodiments of the present application, each data file in the NAS device 003 occupies a storage space with a same data volume. The correspondence is a one-to-one correspondence, and a filename and a disk block number having the one-to-one correspondence are represented by a same Arabic numeral. The first directory determining unit may include a number obtaining subunit, a remainder obtaining subunit, and a quotient obtaining subunit.

The number obtaining subunit is configured to obtain the maximum number of data files in each storage directory, wherein the maximum number of data files in each storage directory is the same.

The remainder obtaining subunit is configured to divide the received filename of the data file in the NAS device 003 by the maximum number to obtain a remainder.

The quotient obtaining subunit is configured to determine whether the remainder is 0; if so, divide the received filename of the data file in the NAS device 003 by the maximum number to obtain a quotient, and determine, according to the quotient, the NAS device storage directory in which the data file corresponding to the received filename of the data file in the NAS device 003 is located; if not, divide the received filename of the data file in the NAS device 003 by the maximum number to obtain a quotient, add the quotient and 1 to obtain an addition result, and determine, according to the addition result, the NAS device storage directory in which the data file corresponding to the received filename of the data file in the NAS device 003 is located.

The NAS device storage directory further stores a control file in which metadata information is stored.

Specifically, the data sending unit 400 may be configured to return video data in the data file having the received filename in the determined storage directory in the NAS device 003 to the client device 004 by using the metadata information in the control file, according to the reading request.

In a reading device for reading video data in a NAS device provided in embodiments of the present application, the NAS device is mounted to a block interface of the storage server and includes a plurality of data files, and the correspondence between disk block numbers of block devices and filenames of the data files in the NAS device is stored in the index server. Furthermore, in the present application, a reading request sent by the client device is received, a filename of a data file in which the data to be read is located is determined, and then a reading operation is performed in the data file corresponding to the determined filename in the NAS device. In the present application, a reading operation on a block device is transformed into a reading operation on a data file in a NAS device so that a video cloud storage system can support the NAS device.

A video cloud storage system is also provided in the present application. As shown in FIG. 2, the system may include an index server 001, a Network Attached Storage (NAS) device 003 and any of storage servers 002 described above. The NAS device 003 is mounted to a block interface of the storage server 002, and the storage server 002 is connected to the index server 001, the NAS device 003, and a client device 004 respectively. The NAS device 003 includes a plurality of data files. The correspondence between disk block numbers of block devices and filenames of the data files in the NAS device 003 is stored in the index server 001. The reading device for reading video data in a NAS device provided in embodiments of the present application is applied to a storage server 002 in the video cloud storage system as shown in FIG. 2.

Figure 6:
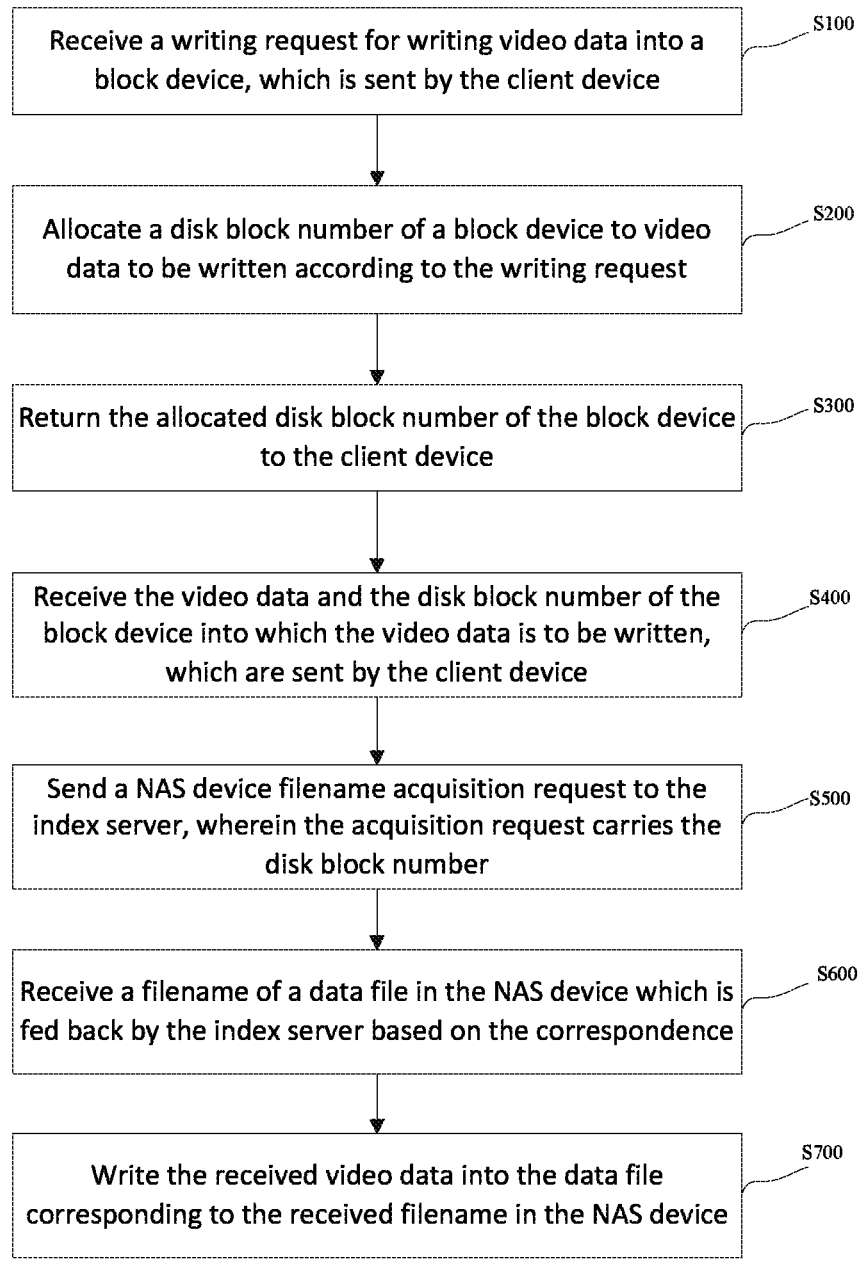
FIG. 6 is a flow chart of a method for writing video data in a NAS device according to an embodiment of the present application.

As shown in FIG. 6, a method for writing video data into a NAS device is provided in an embodiment of the present application, which is applied to a storage server in a video cloud storage system. As shown in FIG. 2, the video cloud storage system includes an index server 001, a storage server 002 and a Network Attached Storage (NAS) device 003. The NAS device 003 is mounted to a block interface of the storage server 002, and the storage server 002 is connected to the index server 001, the NAS device 003, and a client device 004 respectively. The NAS device 003 includes a plurality of data files. The correspondence between disk block numbers of block devices and filenames of the data files in the NAS device 003 is stored in the index server 001. The method may include:

S100. Receive a writing request for writing video data into a block device, which is sent by the client device 004.

S200. Allocate a disk block number of a block device to video data to be written according to the writing request.

S300. Return the allocated disk block number of the block device to the client device 004.

S400. Receive the video data and the disk block number of the block device into which the video data is to be written, which are sent the client device 004.

S500. Send a NAS device filename acquisition request to the index server 001, wherein the acquisition request carries the disk block number.

S600. Receive a filename of a data file in the NAS device 003 which is fed back by the index server 001 based on the correspondence.

S700. Write the received video data into the data file corresponding to the received filename in the NAS device 003.

In other embodiments of the present application, the NAS device 003 can be mounted to the block interface of the storage server 002 by establishing a communication path between the block interface of the storage server 002 and the NAS device 003.

Any number of NAS devices 003 can be mounted to the storage server 002.

Figure 7:
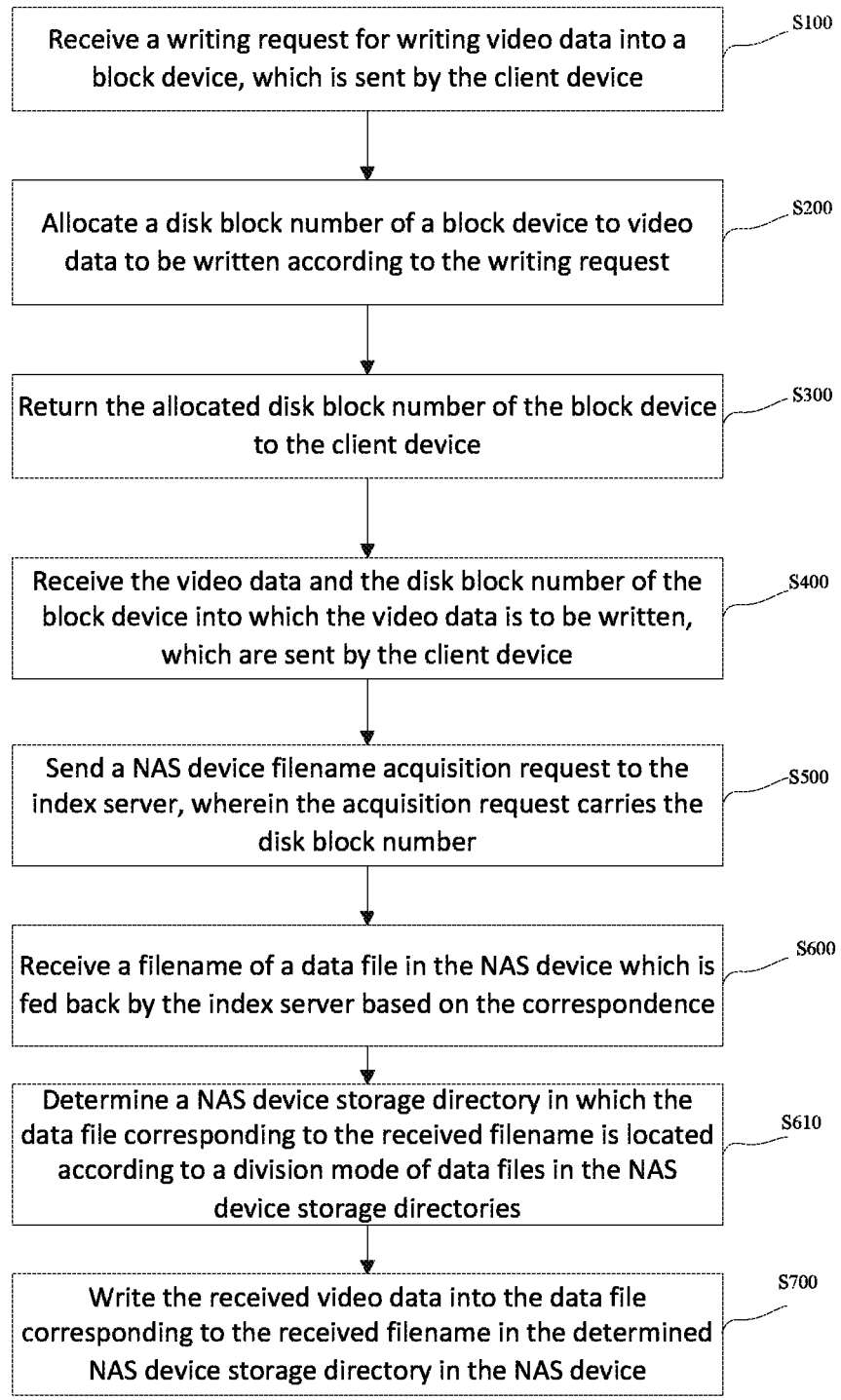
FIG. 7 is a flow chart of a method for writing video data in a NAS device according to another embodiment of the present application.

In other embodiments of the present application, the NAS device 003 includes a plurality of NAS device storage directories, each of which includes a plurality of data files. As shown in FIG. 7, after Step 600 and before Step 700, the method may further include:

S610. Determine the NAS device storage directory in which the data file corresponding to the received filename is located according to a division mode of data files in the NAS device storage directories.

Specifically, S700 may include: writing the received video data into the data file corresponding to the received filename in the determined NAS device storage directory in the NAS device 003.

In other embodiments of the present application, data files in a storage directory may be divided in many ways, for example, according to a fixed size. For ease of management, an upper limit is set for the number of data files in each storage directory. Of course, the data files may also be divided in other ways, rather than according to a fixed size, and the present application is not limited in this regard.

In other embodiments of the present application, each data file in the NAS device 003 occupies a storage space with a same data volume. The correspondence is a one-to-one correspondence, and a filename and a disk block number having the one-to-one correspondence are represented by a same Arabic numeral. The step 610 may include:

obtaining the maximum number of data files in each storage directory, wherein the maximum number of data files in each storage directory is the same;

dividing the received filename of the data file in the NAS device 003 by the maximum number to obtain a remainder;

determining whether the remainder is 0; if so, dividing the received filename of the data file in the NAS device 003 by the maximum number to obtain a quotient, and determining, according to the quotient, the NAS device storage directory in which the data file corresponding to the received filename of the data file in the NAS device 003 is located; if not, dividing the received filename of the data file in the NAS device 003 by the maximum number to obtain a quotient, adding the quotient and 1 to obtain an addition result, and determining, according to the addition result, the NAS device storage directory in which the data file corresponding to the received filename of the data file in the NAS device 003 is located.

Alternatively, the NAS device storage directory further stores a control file in which metadata information is stored. S700 may include:

writing the received video data into the data file corresponding to the received filename in the determined storage directory, according to the metadata information in the control file.

The metadata information may include: the size of the control file, the size of the data file, the size of information region of the data file, and so on.

In other embodiments of the present application, the storage directory may store a main control file and a backup control file, which are the same as each other and back up each other, so as to prevent the damage or loss of one of them. In addition, the data file may further include three parts: a data region, a main information region and a backup information region, wherein the data region is configured to store video data of users, and the main information region and the backup information region have the same data, back up each other, and store index information of the data region.

In a method for writing video data into a NAS device provided in embodiments of the present application, the NAS device is mounted to a block interface of the storage server and includes a plurality of data files, and the correspondence between disk block numbers of block devices and filenames of the data files in the NAS device is stored in the index server. Furthermore, in the present application, a writing request sent by the client device is received, a filename of a data file into which the data is to be written is determined, and then the data is written into the data file corresponding to the determined filename in the NAS device. In the present application, a writing operation on a block device is transformed into a writing operation on a data file in a NAS device so that a video cloud storage system can support the NAS device.

Figure 8:
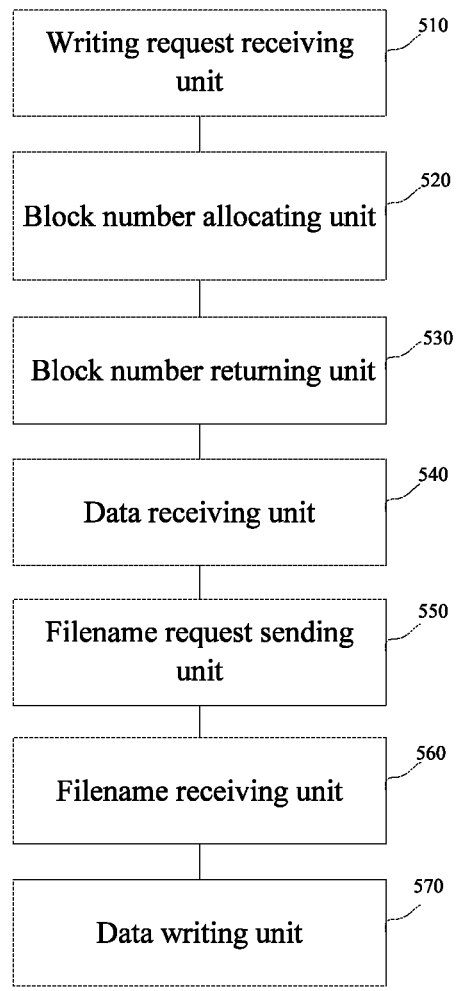
FIG. 8 is a structural schematic diagram of a writing device for writing video data in a NAS device according to an embodiment of the present application.

In correspondence with the method embodiment illustrated in FIG. 6, a writing device for writing video data into a NAS device is provided in embodiments of the present application, which is applied to a storage server in a video cloud storage system. As shown in FIG. 2, the video cloud storage system may include an index server 001, a storage server 002 and a Network Attached Storage (NAS) device 003. The NAS device 003 is mounted to a block interface of the storage server 002, and the storage server 002 is connected to the index server 001, the NAS device 003, and a client device 004 respectively. The NAS device 003 includes a plurality of data files. The correspondence between disk block numbers of block devices and filenames of the data files in the NAS device 003 is stored in the index server 001. As shown in FIG. 8, the device may include a writing request receiving unit 510, a block number allocating unit 520, a block number returning unit 530, a data receiving unit 540, a filename request sending unit 550, a filename receiving unit 560 and a data writing unit 570.

The writing request receiving unit 510 is configured to receive a writing request for writing video data into a block device, which is sent by the client device 004.

The block number allocating unit 520 is configured to allocate a disk block number of a block device to video data to be written according to the writing request.

The block number returning unit 530 is configured to return the allocated disk block number of the block device to the client device 004.

The data receiving unit 540 is configured to receive the video data and the disk block number of the block device into which the video data is to be written, which are sent by the client device 004.

The filename request sending unit 550 is configured to send a NAS device filename acquisition request to the index server 001, wherein the acquisition request carries the disk block number.

The filename receiving unit 560 is configured to receive a filename of a data file in the NAS device 003 which is fed back by the index server 001 based on the correspondence.

The data writing unit 570 is configured to write the received video data into the data file corresponding to the received filename in the NAS device 003.

In other embodiments of the present application, the NAS device 003 includes a plurality of NAS device storage directories, each of which includes a plurality of data files. The device as shown in FIG. 8 may further include a second directory determining unit configured to determine a NAS device storage directory in which the data file corresponding to the received filename is located according to a division mode of data files in the NAS device storage directories, after the filename receiving unit 560 receives the filename of the data file in the NAS device 003 which is fed back by the index server 001 based on the correspondence and before the data writing unit 570 writes the received video data into the data file corresponding to the received filename in the NAS device 003.

Specifically, the data writing unit 570 is configured to write the received video data into the data file corresponding to the received filename in the determined NAS device storage directory in the NAS device 003.

In other embodiments of the present application, each data file in the NAS device 003 occupies a storage space with a same data volume. The correspondence is a one-to-one correspondence, and a filename and a disk block number having the one-to-one correspondence are represented by a same Arabic numeral. The second directory determining unit may include a number obtaining subunit, a remainder obtaining subunit, and a quotient obtaining subunit.

The number obtaining subunit is configured to obtain the maximum number of data files in each storage directory, wherein the maximum number of data files in each storage directory is the same.

The remainder obtaining subunit is configured to divide the received filename of the data file in the NAS device 003 by the maximum number to obtain a remainder.

The quotient obtaining subunit is configured to determine whether the remainder is 0; if so, divide the received filename of the data file in the NAS device 003 by the maximum number to obtain a quotient, and determine, according to the quotient, the NAS device storage directory in which the data file corresponding to the received filename of the data file in the NAS device 003 is located; if not, divide the received filename of the data file in the NAS device 003 by the maximum number to obtain a quotient, add the quotient and 1 to obtain an addition result, and determine, according to the addition result, the NAS device storage directory in which the data file corresponding to the received filename of the data file in the NAS device 003 is located.

The NAS device storage directory further stores a control file in which metadata information is stored. Specifically, the data writing unit 570 is configured to write the received video data into the data file corresponding to the received filename in the determined storage directory, according to the metadata information in the control file.

In a writing device for writing video data into a NAS device provided in embodiments of the present application, the NAS device is mounted to a block interface of the storage server and includes a plurality of data files, and the correspondence between disk block numbers of block devices and filenames of the data files in the NAS device is stored in the index server. Furthermore, in the present application, a writing request sent by the client device is received, a filename of a data file into which the data is to be written is determined, and then the data is written into the data file corresponding to the determined filename in the NAS device. In the present application, a writing operation on a block device is transformed into a writing operation on a data file in a NAS device so that a video cloud storage system can support the NAS device.

A video cloud storage system is also provided in an embodiment of the present application. As shown in FIG. 2, the system may include an index server 001, a Network Attached Storage (NAS) device 003 and a storage server 002. The NAS device 003 is mounted to a block interface of the storage server 002, and the storage server 002 is connected to the index server 001, the NAS device 003, and a client device 004 respectively. The NAS device 003 includes a plurality of data files. The correspondence between disk block numbers of block devices and filenames of the data files in the NAS device 003 is stored in the index server 001. The writing device for writing video data into a NAS device provided in embodiments of the present application is applied to a storage server 002.

Alternatively, in one embodiment of the present application, the reading device and writing device described above may be but not limited to a reading/writing interface of the storage interface in the video cloud storage system.

Figure 9:
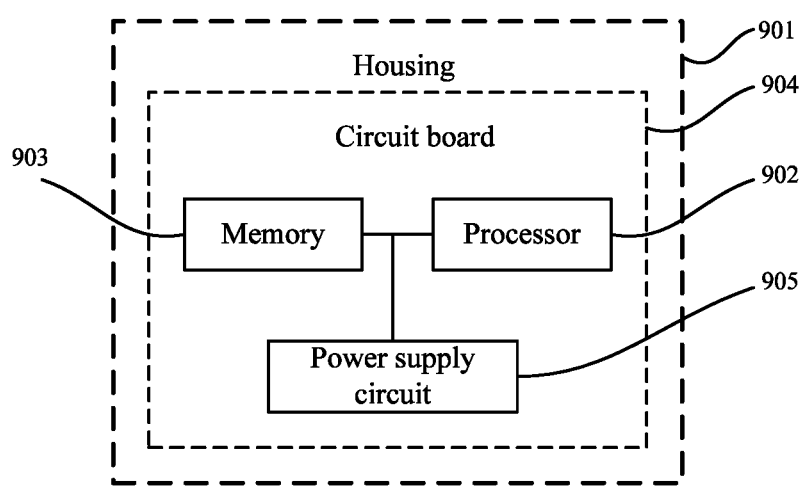
FIG. 9 is a structural schematic diagram of an storage server according to an embodiment of the present application.

As shown in FIG. 9, a storage server is provided in an embodiment of the present application. The storage server includes: a housing 901, a processor 902, a memory 903, a circuit board 904, and a power supply circuit 905, wherein the circuit board 904 is disposed inside a space enclosed by the housing 901, the processor 902 and the memory 903 are disposed on the circuit board 904, the power supply circuit 905 is configured to supply power to various circuits or devices in the storage server, the memory 903 is configured to store an executable code, and the processor 902 executes a program corresponding to the executable code by reading the executable code in the memory 903, so as to perform the following steps:

receiving a reading request sent by the client device, wherein the reading request carries a disk block number of a block device to be read from;

sending a NAS device filename acquisition request to the index server, wherein the acquisition request carries the disk block number;

receiving a filename of a data file in the NAS device which is fed back by the index server based on the correspondence; and returning video data in the data file having the received filename in the NAS device to the client device, according to the reading request;

or, perform the following steps:

receiving a writing request for writing video data into a block device, which is sent by the client device;

allocating a disk block number of a block device to video data to be written according to the writing request;

returning the allocated disk block number of the block device to the client device;

receiving the video data and the disk block number of the block device into which the video data is to be written, which are sent by the client device.

sending a NAS device filename acquisition request to the index server, wherein the acquisition request carries the disk block number;

receiving a filename of a data file in the NAS device which is fed back by the index server based on the correspondence;

writing the received video data into the data file corresponding to the received filename in the NAS device.

For a specific process in which the steps above are performed by the processor 902 and the steps that can be performed by the processor 902 by executing an executable code, reference can be made to the description of the embodiments as shown in FIGS. 1-8 of the present application, and no repeated description is made here.

As described above, in a method and device for reading and writing video data in a NAS device provided in embodiments of the present application, the NAS device is mounted to a block interface of the storage server and includes a plurality of data files, the correspondence between disk block numbers of block devices and filenames of the data files in the NAS device is stored in the index server. Furthermore, in the present application, a reading request or writing request sent by the client device is received, a filename of a data file which the data is to be read from or written into is determined, and then a reading or writing operation is performed in the data file corresponding to the determined filename in the NAS device. In the present application, a reading or writing operation on a block device is transformed into a reading or writing operation on a data file in a NAS device so that a video cloud storage system can support the NAS device.

An embodiment of the present application provides an executable code which is configured to perform, when being executed, the method for reading video data from a NAS device provided in embodiments of the present application, wherein the method for reading video data from a NAS device is applied to a storage server in a video cloud storage system. The cloud storage system includes the storage server, an index server, and a Network Attached Storage (NAS) device. The NAS device is mounted to a block interface of the storage server, and the storage server is connected to the index server, the NAS device, and a client device respectively. The NAS device includes a plurality of data files. The correspondence between disk block numbers of block devices and filenames of the data files in the NAS device is stored in the index server. The method may include:

receiving a reading request sent by the client device, wherein the reading request carries a disk block number of a block device to be read from;

sending a NAS device filename acquisition request to the index server, wherein the acquisition request carries the disk block number;

receiving a filename of a data file in the NAS device which is fed back by the index server based on the correspondence; and returning video data in the data file having the received filename in the NAS device to the client device, according to the reading request.

In a method for reading video data in a NAS device provided in embodiments of the present application, the NAS device is mounted to a block interface of the storage server and includes a plurality of data files, and the correspondence between disk block numbers of block devices and filenames of the data files in the NAS device is stored in the index server. Furthermore, in the present invention, a reading request sent by the client device is received, a filename of a data file in which the data to be read is located is determined, and then a reading operation is performed in the data file corresponding to the determined filename in the NAS device. In the present application, a reading operation on a block device is transformed into a reading operation on a data file in a NAS device so that a video cloud storage system can support the NAS device.

An embodiment of the present application provides an executable code which is configured to perform, when being executed, the method for writing video data into a NAS device provided in embodiments of the present application, wherein the method for writing video data into a NAS device is applied to a storage server in a video cloud storage system. The cloud storage system includes the storage server, an index server, and a Network Attached Storage (NAS) device. The NAS device is mounted to a block interface of the storage server, and the storage server is connected to the index server, the NAS device, and a client device respectively. The NAS device includes a plurality of data files. The correspondence between disk block numbers of block devices and filenames of the data files in the NAS device is stored in the index server. The method may include:

receiving a writing request for writing video data into a block device, which is sent by the client device;

allocating a disk block number of a block device to video data to be written according to the writing request;

returning the allocated disk block number of the block device to the client device;

receiving the video data and the disk block number of the block device into which the video data is to be written, which are sent by the client device.

sending a NAS device filename acquisition request to the index server, wherein the acquisition request carries the disk block number;

receiving a filename of a data file in the NAS device which is fed back by the index server based on the correspondence; and writing the received video data into the data file corresponding to the received filename in the NAS device.

In a method for writing video data into a NAS device provided in embodiments of the present application, the NAS device is mounted to a block interface of the storage server and includes a plurality of data files, and the correspondence between disk block numbers of block devices and filenames of the data files in the NAS device is stored in the index server. Furthermore, in the present application, a writing request sent by the client device is received, a filename of a data file into which the data is to be written is determined, and then the data is written into the data file corresponding to the determined filename in the NAS device. In the present application, a writing operation on a block device is transformed into a writing operation on a data file in a NAS device so that a video cloud storage system can support the NAS device.

An embodiment of the present application provides a storage medium which is configured to store an executable code for performing the method for reading video data in a NAS device provided in embodiments of the present application, wherein the method for reading video data in a NAS device is applied to a storage server in a video cloud storage system. The cloud storage system includes the storage server, an index server, and a Network Attached Storage (NAS) device. The NAS device is mounted to a block interface of the storage server, and the storage server is connected to the index server, the NAS device, and a client device respectively. The NAS device includes a plurality of data files. The correspondence between disk block numbers of block devices and filenames of the data files in the NAS device is stored in the index server. The method may include:

receiving a reading request sent by the client device, wherein the reading request carries a disk block number of a block device to be read from;

sending a NAS device filename acquisition request to the index server, wherein the acquisition request carries the disk block number;

receiving a filename of a data file in the NAS device which is fed back by the index server based on the correspondence; and returning video data in the data file having the received filename in the NAS device to the client device, according to the reading request.

In a method for reading video data in a NAS device provided in embodiments of the present application, the NAS device is mounted to a block interface of the storage server and includes a plurality of data files, and the correspondence between disk block numbers of block devices and filenames of the data files in the NAS device is stored in the index server. Furthermore, in the present application, a reading request sent by the client device is received, a filename of a data file in which the data to be read is located is determined, and then a reading operation is performed in the data file corresponding to the determined filename in the NAS device. In the present application, a reading operation on a block device is transformed into a reading operation on a data file in a NAS device so that a video cloud storage system can support the NAS device.

An embodiment of the present application provides a storage medium, which is configured to store an executable code for performing the method for writing video data into a NAS device provided in embodiments of the present application, wherein the method for writing video data into a NAS device is applied to a storage server in a video cloud storage system. The cloud storage system includes the storage server, an index server, and a Network Attached Storage (NAS) device. The NAS device is mounted to a block interface of the storage server, and the storage server is connected to the index server, the NAS device, and a client device respectively. The NAS device includes a plurality of data files. The correspondence between disk block numbers of block devices and filenames of the data files in the NAS device is stored in the index server. The method may include:

receiving a writing request for writing video data into a block device, which is sent by the client device;

allocating a disk block number of a block device to video data to be written according to the writing request;

returning the allocated disk block number of the block device to the client device;

receiving the video data and the disk block number of the block device into which the video data is to be written, which are sent the client device.

sending a NAS device filename acquisition request to the index server, wherein the acquisition request carries the disk block number;

receiving a filename of a data file in the NAS device which is fed back by the index server based on the correspondence; and writing the received video data into the data file corresponding to the received filename in the NAS device.

In a method for writing video data into a NAS device provided in embodiments of the present application, the NAS device is mounted to a block interface of the storage server and includes a plurality of data files, and the correspondence between disk block numbers of block devices and filenames of the data files in the NAS device is stored in the index server. Furthermore, in the present application, a writing request sent by the client device is received, a filename of a data file into which the data is to be written is determined, and then the data is written into the data file corresponding to the determined filename in the NAS device. In the present application, a writing operation on a block device is transformed into a writing operation on a data file in a NAS device so that a video cloud storage system can support the NAS device.

The embodiments of the system, device, storage server, executable code, and storage medium are briefly described since they are substantially similar to the embodiments of a method, and references can be made to the parts in the description of the embodiments of a method.

It should be noted that the relationship terms herein such as "first", "second" and the like are only configured to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles or devices including a series of elements not only include those elements listed, but also include other elements not specifically listed or the elements intrinsic to these processes, methods, articles, or devices. Without further limitations, elements limited by the wording "include(s)/comprise(s) a/an . . . " do not exclude that there are additional identical elements in the processes, methods, articles, or devices, which include the listed elements.

Various embodiments in the description are all described in a corresponding manner Reference to each other can be made for the same or similar parts between various embodiments and the description of each embodiment focuses on the differences between them. In particular, the description of the embodiments of a system is quite brief since the embodiments of a system are essentially similar with the embodiments of a method, and reference can be made to the parts in the description of the embodiments of method.

The embodiments described above are just preferable embodiments of the present application, and are not indented to limit the protection scope of the present application. Any modifications, alternatives, improvements or the like within the spirit and principle of the present application are included in the protection scope of the present application.

What is claimed is:

1. A method for reading video data in a Network Attached Storage (NAS) device, which is applied to a storage server in a video cloud storage system, wherein the video cloud storage system comprises the storage server, an index server, and a NAS device mounted to a block interface of the storage server; the storage server is connected to the index server, the NAS device, and a client device respectively; the NAS device comprises a plurality of NAS device storage directories, each of which comprises a plurality of data files; and a one-to-one correspondence between disk block numbers of block devices and filenames of the data files in the NAS device is stored in the index server, each data file in the NAS device occupies a storage space with a same data volume, and a filename and a disk block number having the one-to-one correspondence are represented by a same Arabic numeral, and wherein the method comprises:
  receiving a reading request sent by the client device, wherein the reading request carries a disk block number of a block device to be read from;
  sending a NAS device filename acquisition request to the index server, wherein the acquisition request carries the disk block number;
  receiving a filename of a data file in the NAS device which is fed back by the index server based on the correspondence;
  obtaining the maximum number of data files in each storage directory, wherein the maximum number of data files in each storage directory is the same;
  determining a NAS device storage directory in which the data file corresponding to the received filename is located according to a division mode of data files in the NAS device storage directories, based on the maximum number and the received filename; and
  returning video data in the data file having the received filename in the determining NAS device storage directory in the NAS device to the client device according to the reading request.

2. The method of claim 1, wherein determining a NAS device storage directory in which the data file corresponding to the received filename is located according to a division mode of data files in the NAS device storage directories, based on the maximum number and the received filename comprises:

dividing the received filename of the data file in the NAS device by the maximum number to obtain a remainder;

determining whether the remainder is 0; if so, dividing the received filename of the data file in the NAS device by the maximum number to obtain a quotient, and determining, according to the quotient, the NAS device storage directory in which the data file corresponding to the received filename of the data file in the NAS device is located; if not, dividing the received filename of the data file in the NAS device by the maximum number to obtain a quotient, adding the quotient and 1 to obtain an addition result, and determining, according to the addition result, the NAS device storage directory in which the data file corresponding to the received filename of the data file in the NAS device is located.

3. The method of claim 1, wherein the NAS device storage directory further stores a control file in which metadata information is stored; and returning video data in the data file having the received filename in the determined storage directory in the NAS device to the client device according to the reading request comprises:

returning video data in the data file having the received filename in the determined storage directory in the NAS device to the client device by using the metadata information in the control file, according to the reading request.

4. A method for writing video data into a Network Attached Storage (NAS) device, which is applied to a storage server in a video cloud storage system, wherein the video cloud storage system comprises the storage server, an index server, and a NAS device mounted to a block interface of the storage server; the storage server is connected to the index server, the NAS device, and a client device respectively; the NAS device comprises a plurality of NAS device storage directories, each of which comprises a plurality of data files; and a one-to-one correspondence between disk block numbers of block devices and filenames of the data files in the NAS device is stored in the index server, each data file in the NAS device occupies a storage space with a same data volume, and a filename and a disk block number having the one-to-one correspondence are represented by a same Arabic numeral and wherein the method comprises:
 receiving a writing request for writing video data into a block device, which is sent by the client device;
 allocating a disk block number of a block device to video data to be written according to the writing request;
 returning the allocated disk block number of the block device to the client device;
 receiving the video data and the disk block number of the block device into which the video data is to be written, which are sent by the client device;
 sending a NAS device filename acquisition request to the index server, wherein the acquisition request carries the disk block number;
 receiving a filename of a data file in the NAS device which is fed back by the index server based on the correspondence;
 obtaining the maximum number of data files in each storage directory, wherein the maximum number of data files in each storage directory is the same;
 determining a NAS device storage directory in which the data file corresponding to the received filename is located according to a division mode of data files in the NAS device storage directories, based on the maximum number and the received filename; and
 writing the received video data into the data file corresponding to the received filename in the determined NAS device storage directory in the NAS device.

5. The method of claim 4, wherein determining a NAS device storage directory in which the data file corresponding to the received filename is located according to a division mode of data files in the NAS device storage directories, based on the maximum number and the received filename comprises:

dividing the received filename of the data file in the NAS device by the maximum number to obtain a remainder; and determining whether the remainder is 0; if so, dividing the received filename of the data file in the NAS device by the maximum number to obtain a quotient, and determining, according to the quotient, the NAS device storage directory in which the data file corresponding to the received filename of the data file in the NAS device is located; if not, dividing the received filename of the data file in the NAS device by the maximum number to obtain a quotient, adding the quotient and 1 to obtain an addition result, and determining, according to the addition result, the NAS device storage directory in which the data file corresponding to the received filename of the data file in the NAS device is located.

6. The method of claim 4, wherein the NAS device storage directory further stores a control file in which metadata information is stored, and writing the received video data into the data file corresponding to the received filename comprises:

writing the received video data into the data file corresponding to the received filename in the determined storage directory, according to the metadata information in the control file.

7. A reading device for reading video data in a NAS device, which is applied to a storage server in a video cloud storage system, wherein the video cloud storage system comprises the storage server, an index server, and a NAS device mounted to a block interface of the storage server; the storage server is connected to the index server, the NAS device, and a client device respectively; the NAS device comprises a plurality of NAS device storage directories, each of which comprises a plurality of data files; and a one-to-one correspondence between disk block numbers of block devices and filenames of the data files in the NAS device is stored in the index server, each data file in the NAS device occupies a storage space with a same data volume, and a filename and a disk block number having the one-to-one correspondence are represented by a same Arabic numeral, and wherein the reading device comprises:
 a reading request receiving unit configured to receive a reading request sent by the client device, wherein the reading request carries a disk block number of a block device to be read from;
 a filename request sending unit configured to send a NAS device filename acquisition request to the index server, wherein the acquisition request carries the disk block number;
 a filename receiving unit configured to receive a filename of a data file in the NAS device which is fed back by the index server based on the correspondence;
 a first directory determining unit configured to obtain the maximum number of data files in each storage directory, and determine a NAS device storage directory in which the data file corresponding to the received filename is located according to a division mode of data files in the NAS device storage directories based on the maximum number and the received filename, wherein the maximum number of data files in each storage directory is the same; and a data sending unit configured to return video data in the data file having the received filename in the determined NAS device storage directory in the NAS device to the client device, according to the reading request.

8. The reading device of claim 7, wherein each data file in the NAS device occupies a storage space with a same data volume, the correspondence is a one-to-one correspondence, and a filename and a disk block number having the one-to-one correspondence are represented by a same Arabic numeral; and the first directory determining unit comprises:

a remainder obtaining subunit configured to divide the received filename of the data file in the NAS device by the maximum number to obtain a remainder;

a quotient obtaining subunit configured to determine whether the remainder is 0; if so, divide the received filename of the data file in the NAS device by the maximum number to obtain a quotient, and determine, according to the quotient, the NAS device storage directory in which the data file corresponding to the received filename of the data file in the NAS device is located; if not, divide the received filename of the data file in the NAS device by the maximum number to obtain a quotient, add the quotient and 1 to obtain an addition result, and determine, according to the addition result, the NAS device storage directory in which the data file corresponding to the received filename of the data file in the NAS device is located.

9. The reading device of claim 7, wherein the NAS device storage directory further stores a control file in which metadata information is stored; and the data sending unit is configured to return video data in the data file having the received filename in the determined storage directory in the NAS device to the client device by using the metadata information in the control file, according to the reading request.

10. A writing device for writing video data into a Network Attached Storage (NAS) device, which is applied to a storage server of a video cloud storage system, wherein the video cloud storage system comprises the storage server, an index server, and a NAS device mounted to a block interface of the storage server; the storage server is connected to the index server, the NAS device, and a client device respectively; the NAS device comprises a plurality of NAS device storage directories, each of which comprises a plurality of data files; and a one-to-one correspondence between disk block numbers of block devices and filenames of the data files in the NAS device is stored in the index server, each data file in the NAS device occupies a storage space with a same data volume, and a filename and a disk block number having the one-to-one correspondence are represented by a same Arabic numeral and wherein the writing device comprises:

a writing request receiving unit configured to receive a writing request for writing video data into a block device, which is sent by the client device;

a block number allocating unit configured to allocate a disk block number of a block device to video data to be written according to the writing request;

a block number returning unit configured to return the allocated disk block number of the block device to the client device;

a data receiving unit configured to receive the video data and the disk block number of the block device into which the video data is to be written, which are sent by the client device;

a filename request sending unit configured to send a NAS device filename acquisition request to the index server, wherein the acquisition request carries the disk block number;

a filename receiving unit configured to receive a filename of a data file in the NAS device which is fed back by the index server based on the correspondence;

a second directory determining unit configured to obtain the maximum number of data files in each storage directory and determine a NAS device storage directory in which the data file corresponding to the received filename is located according to a division mode of data files in NAS device storage directories based on the maximum number and the received filename, wherein the maximum number of data files in each storage directory is the same;

a data writing unit configured to write the received video data into the data file corresponding to the received filename in the determined NAS device storage directory in the NAS device.

11. The writing device of claim 10, wherein the second directory determining unit comprises:

a remainder obtaining subunit configured to divide the received filename of the data file in the NAS device by the maximum number to obtain a remainder; and a quotient obtaining subunit configured to determine whether the remainder is 0; if so, divide the received filename of the data file in the NAS device by the maximum number to obtain a quotient, and determine, according to the quotient, the NAS device storage directory in which the data file corresponding to the received filename of the data file in the NAS device is located; if not, divide the received filename of the data file in the NAS device by the maximum number to obtain a quotient, add the quotient and 1 to obtain an addition result, and determine, according to the addition result, the NAS device storage directory in which the data file corresponding to the received filename of the data file in the NAS device is located.

12. The writing device of claim 10, wherein the NAS device storage directory further stores a control file in which metadata information is stored; and the data writing unit is configured to write the received video data into the data file corresponding to the received filename in the determined storage directory, according to the metadata information in the control file.

13. A storage server, comprising: a housing, a processor, a memory, a circuit board, and a power supply circuit, wherein the circuit board is disposed inside a space enclosed by the housing, the processor and the memory are disposed on the circuit board, the power supply circuit is configured to supply power to various circuits or devices in the storage server, the memory is configured to store an executable code, and the processor is configured to execute a program corresponding to the executable code by reading the executable code stored in the memory, so as to perform the method for reading video data in a NAS device of claim 1.

14. A storage server, comprising: a housing, a processor, a memory, a circuit board, and a power supply circuit, wherein the circuit board is disposed inside a space enclosed by the housing, the processor and the memory are disposed on the circuit board, the power supply circuit is configured to supply power to various circuits or devices in the storage server, the memory is configured to store an executable code, and the processor is configured to execute a program corresponding to the executable code by reading the executable code stored in the memory, so as to perform the method for writing video data into a NAS device of claim 4.

* * * * *